United States Patent

Cooper et al.

[11] Patent Number: 5,850,504
[45] Date of Patent: Dec. 15, 1998

[54] METHOD AND APPARATUS FOR SAVING PRINTER MEMORY

[75] Inventors: Michael David Cooper, San Jose; Michael L. Hodgson, Saratoga; Patrick Swee-Hock Ong, Palo Alto; James G. Sandman, Jr., Los Altos Hills; Paul D. Rovner, Palo Alto; Edward Reid Fiala, Sunnyvale, all of Calif.

[73] Assignee: Adobe Systems Incorporated, Mountain View, Calif.

[21] Appl. No.: 703,846

[22] Filed: Aug. 27, 1996

Related U.S. Application Data

[62] Division of Ser. No. 21,190, Feb. 23, 1993.

[51] Int. Cl.$^6$ ............................................. G06F 15/00
[52] U.S. Cl. .................................................. 395/117
[58] Field of Search ................................... 395/101, 109, 395/112, 114, 116, 115, 117, 400; 340/735; 358/296, 133, 86; 400/121; 341/51; 382/232, 233, 239, 244; 364/970, 970.1, 970.4, 971.1

[56] References Cited

U.S. PATENT DOCUMENTS

| | | | |
|---|---|---|---|
| 4,028,731 | 6/1977 | Arps et al. | 358/260 |
| 4,881,180 | 11/1989 | Nishiyama | 364/518 |
| 5,045,852 | 9/1991 | Mitchell et al. | 341/51 |
| 5,050,100 | 9/1991 | Damon et al. | 364/514 |
| 5,129,049 | 7/1992 | Cuzzo et al. | 395/113 |
| 5,150,454 | 9/1992 | Wood et al. | 395/114 |
| 5,150,455 | 9/1992 | Morikawa et al. | 395/114 |
| 5,204,738 | 4/1993 | Aragaki et al. | 358/75 |
| 5,272,768 | 12/1993 | Bauman et al. | 395/5 |
| 5,337,258 | 8/1994 | Dennis | 364/551.01 |
| 5,369,533 | 11/1994 | Ottesen et al. | 360/51 |
| 5,479,587 | 12/1995 | Campbell et al. | 395/116 |
| 5,509,115 | 4/1996 | Butterfield et al. | 395/147 |
| 5,535,311 | 7/1996 | Zimmerman | 395/114 |
| 5,602,976 | 2/1997 | Cooper et al. | 395/116 |

FOREIGN PATENT DOCUMENTS

| | | |
|---|---|---|
| 0 378 316 A1 | 7/1990 | European Pat. Off. |
| 0 411 232 A2 | 2/1991 | European Pat. Off. |
| 0 470 782 A3 | 2/1992 | European Pat. Off. |
| 0 510 923 A3 | 10/1992 | European Pat. Off. |
| 0 613 102 A1 | 8/1994 | European Pat. Off. |
| A-04 088 583 | 3/1992 | Japan . |

OTHER PUBLICATIONS

Pratt, W.K., 1978. *Digital Image Processing*, John Wiley and Sons.
Clark, R.J., 1985. *Transform Coding of Images*, Academic Press.

*Primary Examiner*—David K. Moore
*Assistant Examiner*—Gabriel I. Garcia
*Attorney, Agent, or Firm*—Fish & Richardson P.C.

[57] ABSTRACT

A page printer uses alternative internal representations for the print data in each of multiple lateral strips that make up the page. Page description language input is converted to an intermediate display list format that is sorted into display commands associated with each strip. If during input the display list representation of the data fills the memory allotted to its storage, one or more of the strips is converted from display list format to raster format and compressed using a lossless compression algorithm. If storage of compressed strips subsequently exceeds available memory, raster data is further compressed using a lossy compression algorithm. Additional display list commands are rasterized by decompressing the compressed strips, processing the new commands and recompressing the data using lossless or lossy compression as required. If the display list does not overflow memory during input, the complete strips are rasterized and compressed one at a time in the order in which they will be printed. The rasterizing time is stored. Should memory overflow at any point in the process, then the rasterizing times for the remaining strips are determined without storing the raster output. A decision can then be made for each strip to rasterize it to the print engine on the fly, pre-compute and store it as lossless compressed raster data, or revert to a lossy-compressed pre-computed version.

19 Claims, 3 Drawing Sheets

METHOD AND APPARATUS FOR SAVING PRINTER MEMORY

This is a divisional of application Ser. No. 08/021,190, filed Feb. 23, 1993 now abandoned.

FIELD OF THE INVENTION

This invention relates to printers and, more particularly, to a method and apparatus for minimizing the amount of memory required for supplying graphical information to a print mechanism which moves at a predetermined speed.

BACKGROUND OF THE INVENTION

Page printers, such as laser printers, receive data in page description language form before starting the printing process. With a page description language a page is represented using graphics, text, and images that can be specified to be located anywhere on the page, and in any order, using successive commands of the language. The page description language commands reflect the way the page is composed. However, before printing, the received data must be rasterized so the print mechanism ("print engine") in the printer can print the page while moving the paper uniformly in one direction, usually top to bottom.

Rasterization is the process of converting data that represents a page or portion of a page into a series of individual dots or pixels across the printed page to form a raster scanline, producing successive scanlines one after another down the page. The complete set of scanlines for a page is the raster data for the page. Rasterization is performed in the page printer by a raster generator.

Many page printers rasterize and store the entire raster data for a page before starting to send data to the print engine of the printer. The print engine must run at a predetermined speed. Therefore precomputing the entire page of raster data ensures that each raster scanline is ready to send when needed by the print engine.

To store the raster data for an entire page may require substantial memory. Laser printers have commonly printed about 80 square inches of graphic information on a page at a resolution of 300 dots per inch, both horizontally and vertically. With one bit indicating each dot to be printed or left unprinted, over 875 K bytes (one byte equals eight bits) are required to store the raster data for an entire page. To increase the printer speed, a second page of raster data may be computed and stored in additional memory as the raster data for the first page is being sent incrementally to the print engine. Having a second page doubles the memory requirements.

New printer technology is enabling 600×600 dot (or pixel) resolution continuous tone color printing which may require 24 bits per pixel or more. If full-page storage is used to meet high resolution color requirements, over 80 million bytes of memory per page is required; 160 million bytes of memory are thus required for storing two pages. This is expensive, even relative to the cost of a high-performance color printer.

For low-end printers the memory requirements are less, but the portion of the cost of the memory relative to other printer costs is higher. To provide users with improved printers at lower cost, memory requirements must be reduced.

Several methods have been employed to reduce printer memory requirements while minimizing "printer overrun" errors. A printer overrun error occurs when rasterization does not keep up with the predetermined speed of the print engine. A printer overrun prevents printing the remainder of the page. One method (referenced by Cuzzo, et. al, U.S. Pat. No. 5,129,049) is to store the second page in a format that is more compact than a raster image, so the memory required for it is less than that required for the first full page raster image. The second page could be stored in its original page description language commands, but doing so would not yield the advantage of overlapping the processing time for rasterizing the second page while the first page is being printed. Instead, the page description language commands for the second page are converted on input to an intermediate representation called a "display list." A display list is a sequence of display list commands. Display list commands are relatively simple drawing commands that are faster to rasterize than the original page description language commands. The display list page representation is more compact than a full page of raster data.

Display list commands for the page can be sorted by their position on the page as they are created. By sorting, the display list commands for a page can be separated into multiple sublists. Each sublist is localized for a particular area of the page. This results in display list commands being localized for each area, which leads to another method of saving memory described below.

Rather than rasterize the entire display list for a page before printing, the page is divided into contiguous horizontal strips, and only some of the strips are rasterized before the start of the printing process. All the information for a given strip is contained in the display list commands for that strip. Others are rasterized after printing has started but before they are required by the print engine. By measuring or estimating the rasterization times and keeping track of the running total, some strips may be allowed to take longer to rasterize than others of the same size, so long as the cumulative time stays ahead of the print engine. This is described in the Cuzzo, et. al. patent referenced above and incorporated herein by reference. If the rasterization time for rasterization-on-the fly is too large, then one or more strips may be completely pre-rasterized. This approach ensures that the printing process will never fail due to running out of rasterization time, avoiding printer overruns.

In the art, rasterization time estimates are often used rather than performing the rasterization and measuring the actual time required. The actual rasterization time may be measured without storing the raster data that results from the process. Good estimates are obtained from formulas based on the parameters that drive the rasterization process. Time estimates must take into account possible processor interruptions for handling unrelated tasks such as communications.

While avoiding printer overruns and minimizing average memory requirements, prior art methods still are subject to running out of memory for difficult cases. In the extreme case of a complex page where each strip requires prerasterization, the printer requires as much memory as a printer that employs no memory-saving technique. Even short of this extreme, minimizing the number of cases that fail requires increasing the amount of available memory.

It is therefore an object of this invention to provide an improved method and system for minimizing the memory requirements for page printers.

It is another object of this invention to provide an improved method and system for preventing loss of printed output for complex pages printed on page printers having limited memory.

SUMMARY OF THE INVENTION

A page printer is described which uses alternative representations for the print data in each of multiple lateral strips that make up the page. The printer contains a raster generator which has a processor and a fixed total amount of memory for storing print data in alternative representations within the memory. The raster generator ultimately provides a raster data representation of each strip from which raster scanlines are supplied to the print engine.

Data is supplied to the printer as a series of page description language commands. The page description language commands are converted by the raster generator upon input to an intermediate display list of drawing primitives that are then divided and sorted into commands associated with each strip. Depending upon the memory demands of the data for a particular page, the raster generator will keep each strip in its display list representation or convert it into one of several other intermediate representations.

If during input the display list representation of the data fills the memory allotted to its storage, one or more of the strips is converted from display list format to raster format and compressed using a lossless compression algorithm. If storage of compressed strips subsequently exceeds available memory, raster data is further compressed using a lossy compression algorithm which can be assured to produce data sets that will fit within the memory allotment. Then additional display list commands are rasterized by decompressing the compressed strips, processing the new display list commands and recompressing the data using lossless or lossy compression as required. If the display list commands do not overflow memory during input, the complete strips are rasterized and compressed one at a time in the order in which they will be printed. The time to rasterize each strip can be estimated by the processor and stored, or the processor may actually compute and store the time for each strip. Should memory for the compressed strips overflow at any point in the process, then the rasterizing times for the remaining strips may be determined or estimated and then stored without storing the raster output.

Based on the stored rasterizing times, the processor determines for each strip whether to rasterize it to the print engine on the fly, to pre-compute and store it as a lossless compressed raster data, to revert to a lossy-compressed pre-computed version, or to store it as uncompressed raster data.

DETAILED DESCRIPTION OF THE INVENTION

Figure 1:
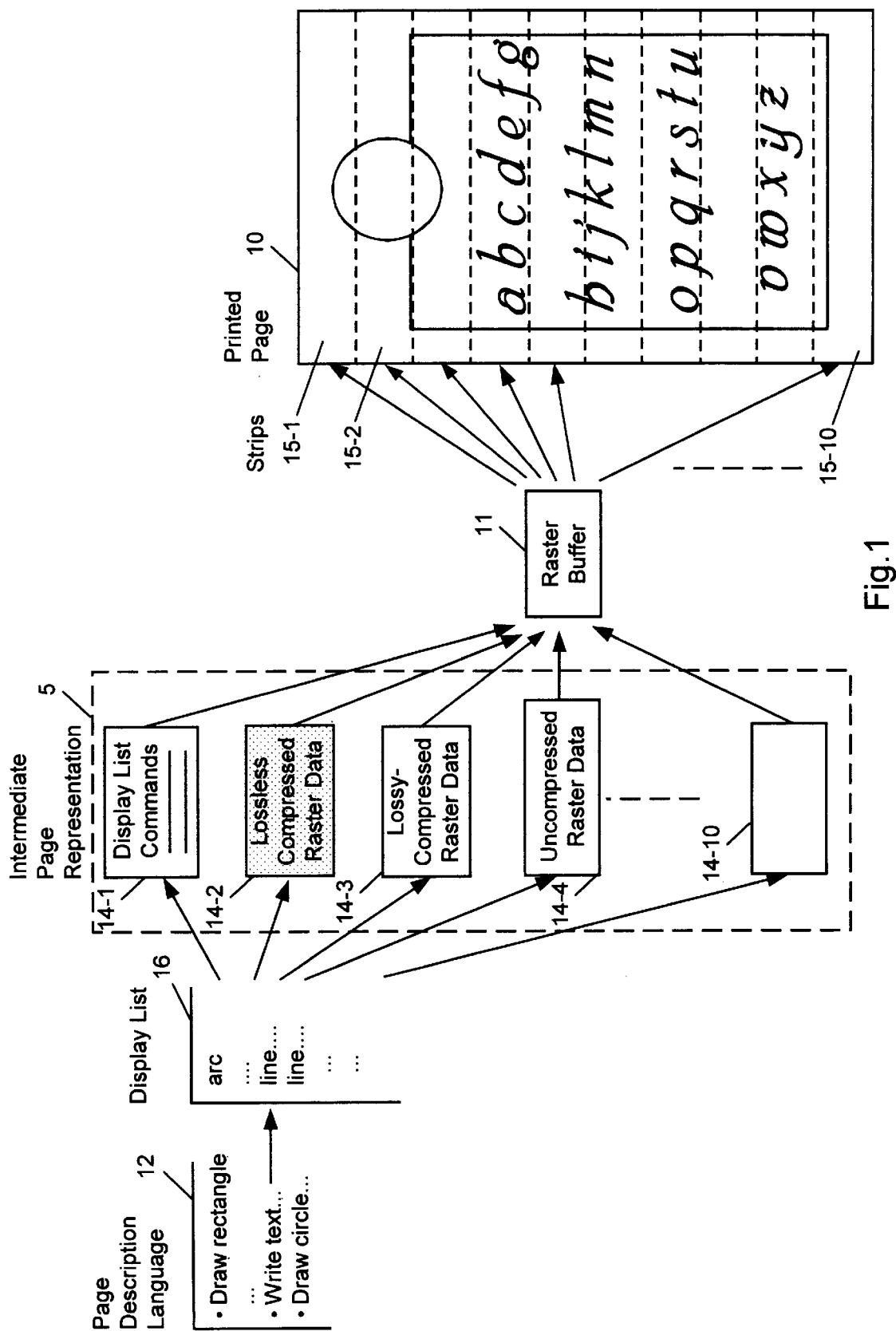
FIG. 1 shows how alternative representations of data are used to represent strips on a printed page.

With reference to FIG. 1, in overview, a page printer incorporating the invention receives page description language commands 12 and converts the page description language commands to display list commands 16. The display list commands are stored into strip representations 14-1 through 14-10 that correspond to strips 15-1 though 15-10 on the printed page and sometimes converted to other representations. If storage becomes a limiting factor, display list commands 16 are converted to raster data or compressed raster data in the strip representations 14-1 through 14-10. Collectively the strip representations 14-1 through 14-10 form an intermediate page representation 5 of the data describing a printed page 10. The page is printed by converting in sequence the various strip representations 14-1 through 14-10 back to raster data. Raster data for a raster scanline or strip temporarily may be stored in a raster buffer 11 before printing.

The page data is received from a host computer as a sequence of page description language commands 12. The page description language commands 12 may include a combination of text and graphics commands as well as embedded imagery. Any individual page description language command may place text, graphics, or imagery on any part of the page, so that printing cannot begin until all of the page description language commands 12 for an entire page have been received and processed.

In the example illustrated, the page is logically divided into ten lateral strips 15-1 through 15-10. Each strip has predefined upper and lower boundaries across the page. The strips typically are of equal size. Each page description language command is translated, as it is received, into a series of display list commands 16. The display list commands 16 are generated so that each command pertains only to a single strip. The data 14-1 through 14-10 represents the corresponding strips 15-1 through 15-10. Thus if the print contribution from a page description language command extends vertically over the whole page, it will result in at least one display list command being generated in correspondence to each page strip 15-1 through 15-10. As explained below, if memory becomes a limitation, display list commands for a strip may be converted to another type of data representing the strip, but if memory is not a limiting factor, all the representations 14-1 through 14-10 will be in the form of display list commands upon completion of the input of page description language commands 12. If a representation 14-1 is left in display list form it is not copied to a different region of memory, but rather linked to the intermediate representation of the page 5 with a data pointer.

As display list commands 16 are generated, each is immediately added to one of the individual strip representations 14-1 to 14-10. Since the printed page 10 can be printed from the display list commands 16 as well as it could have been from the original page description language commands 12, the complete display list for a strip is an alternative representation for that strip, and the whole set of display list commands 16 for all strips is an alternative representation for the complete printed page 10.

The use of alternative representations for strips is a key concept of the invention. Ultimately, the print engine requires a raster data representation for each strip which may be stored in a raster buffer 11. In the raster data representation, the page is described as a matrix of numbers, each number corresponding to a single pixel or dot to be printed on the page. The number gives the color or intensity to be printed at that point.

The raster data for a strip usually contains regions of repeated pixels or patterns of pixels that can be compressed. As a simple example, between lines of text there are whole raster lines of blank pixels, and using a shorthand notation for a wholly blank line would save storage space for raster data from text. Much effort has been devoted to the subject of image compression, and many elaborate methods developed. The text *Digital Image Processing* by W. K. Pratt (John Wiley and Sons, 1978) provides an overview of the techniques. *Transform Coding of Images* by R. J. Clark (Academic Press, 1985) provides more specialized treatment.

Compression techniques are described in two categories, lossless and lossy. A lossless compression method allows the data that was compressed to be reconstructed exactly when decompressed. Lossless compression is reversible, as opposed to lossy compression which is irreversible. Lossy techniques provide for only an approximate reconstruction upon decompression. Approximate reconstruction is often acceptable for images because the eye does not detect small anomalies in an image. Lossy techniques are used either to provide greater compression factors than lossless techniques or to provide a predictable ratio of uncompressed to compressed size. Many lossy techniques allow a broad range of trade-offs between accuracy of the restored image and the compression ratio. As a practical matter, a predetermined amount of memory which holds substantially less than a whole page of raster imagery can be provided in a printer while ensuring that the user will receive acceptable printed results.

Also key to the invention is that lossless and lossy compressed raster data provide two or more alternative representations of page strips. Lossy compression techniques may provide different representations at different compression factors. Memory savings are traded off against the degree of degradation which the lossy compression techniques will cause. However, highly compressed storage may be used under circumstances when memory is at a premium.

For the invention, a suitable example of lossless compression is run length encoding combined with Huffman coding, as is well known in the art. A suitable lossy compression technique is a method provided as a standard from the Joint Photographic Experts Group (JPEG) of the International Standards Organization (ISO).

The next key concept is that having identified alternative representations for page strips, it is possible to provide an intermediate representation of a whole page that allows different strip representation types to be included in different combinations that best fit the characteristics of any particular printed page.

The method of the invention is distinguished by the selection of alternative types of strip representations so that available memory is never exceeded and print overruns are always avoided. Within those two absolute constraints, the method of the invention first chooses alternatives which minimize the processing time needed to process the page. If a page is simple and does not challenge memory limits, the processing will be fast. If a page is unusually complex and memory use is intensive, the processing may slow substantially and the quality may be reduced, but the user will always receive a full printed page output.

Figure 2:
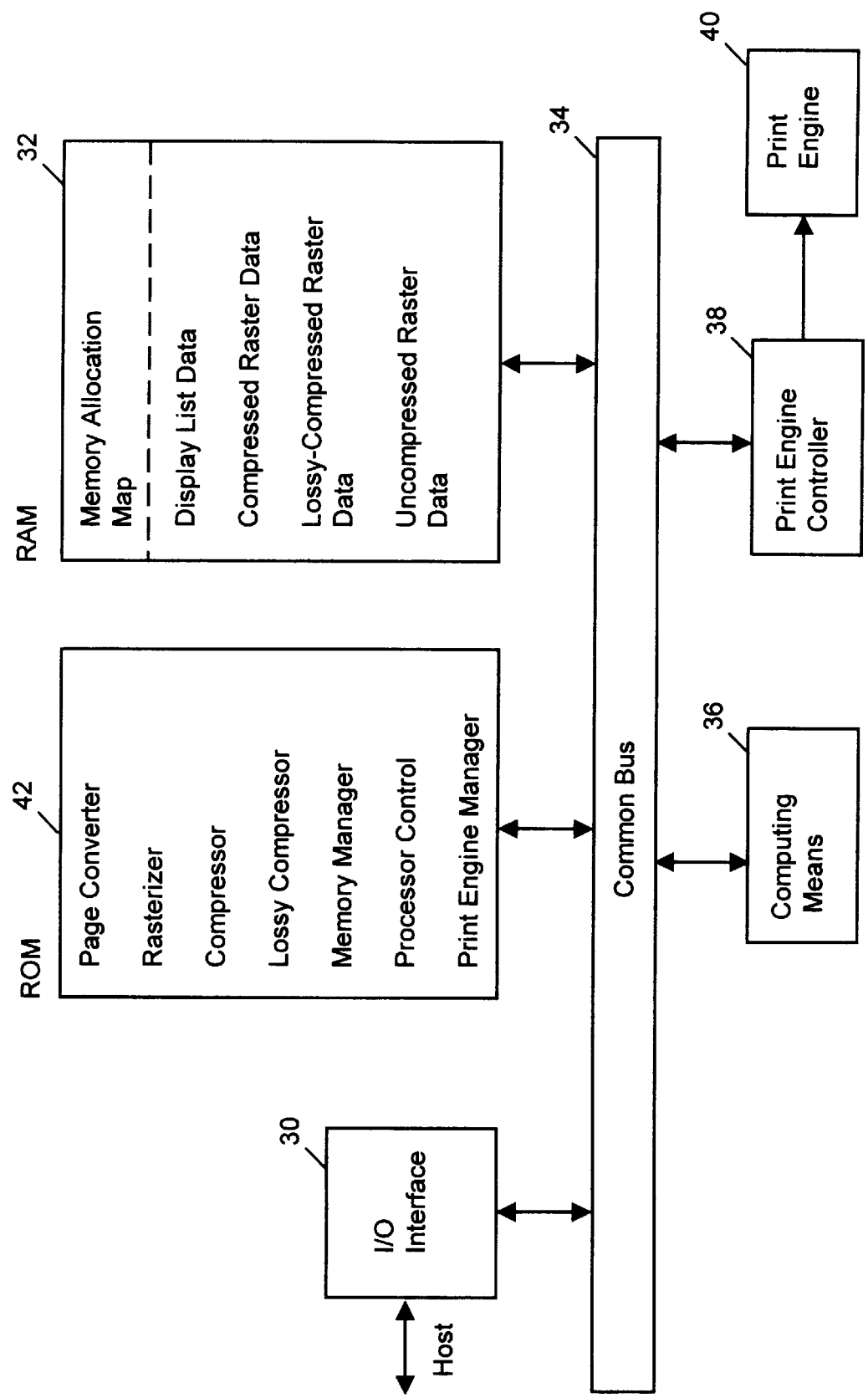
FIG. 2 is a block diagram of a printer that embodies the invention.

Referring to FIG. 2, a printer embodying the invention includes an input/output (I/O) interface 30 for receiving page description language commands over a cable or network from the host computer which outputs page description language commands to the common bus 34. Error messages and control information relating to the transfer of data is communicated back to the host via the I/O interface 30. As each page description language command is received, it is stored in random access memory (RAM) 32 over the common bus 34. A microprocessor 36 on the common bus 34 provides the computation and control for generating raster data and supplying the raster data to the print engine controller 38, which in turn passes the raster data to the electromechanical print engine 40 that applies the image to paper.

The program for the microprocessor 36 is permanently stored in a read-only memory (ROM) 42 Input data, intermediate results including the intermediate page representations, the raster buffer data for the current decompressed strip to be sent to the print engine controller and all other variable data are stored in shared RAM 32. A feature of the invention is the ability to make the most efficient use of memory by sharing storage space within a single memory for different representations. Memory allocation is the process of dividing up a memory into portions for different purposes. A table, called an "allocation map," may be kept at a fixed location in memory to record how the rest of the memory is assigned for each purpose. Memory allocations may be changed dynamically during processing. This is an advantage over using separate memories for each representation because each separate memory must be sized for its individual worst case. With separate memories, spare space in one memory cannot be allocated for use by another. The microprocessor 36, ROM 42, RAM 32 and common bus 34 work together as a raster generator to convert the input page description language commands to raster data driving print engine controller 38. A standard commercial microprocessor, such as the Motorola 68000 family or the Intel i860 family may be used as the microprocessor 36. The RAM 32 is built using conventional dynamic random access memory (DRAM) semiconductor chips. Other required components are conventional commercial digital semiconductor chips or application specific integrated circuits (ASICs) known in the art and used with printed circuit interconnection technology.

Figure 3:
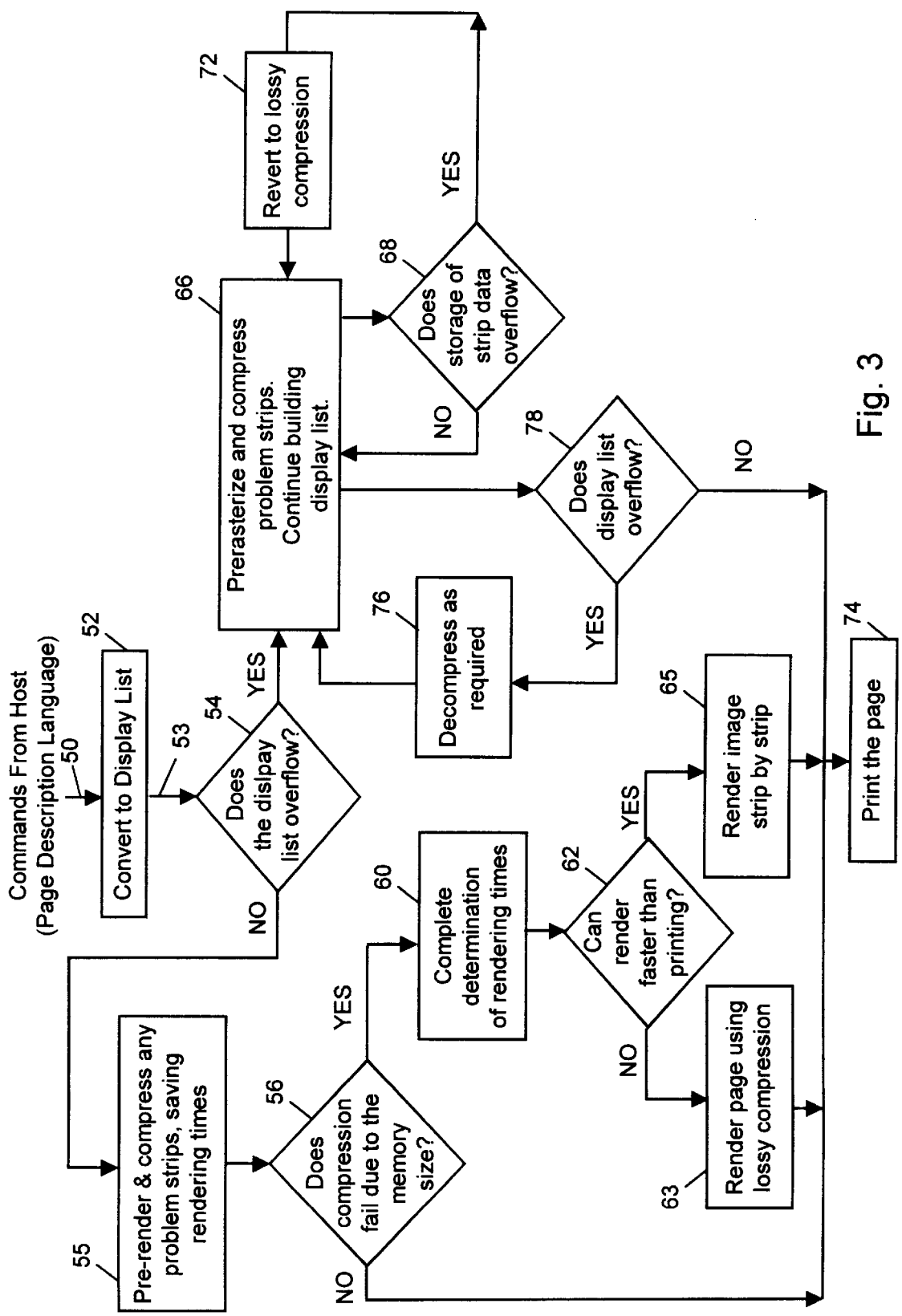
FIG. 3 is a high level flow diagram of the method of the invention.

Referring now to FIG. 3, page processing begins with conversion step 52 of page description language commands 50 from the host into display list commands 53. As the display list commands are generated, they are concurrently sorted into sublists by linking new commands to a linked list associated with each strip.

The display list is continually tested for overflow at step 54 to see if the maximum allocated memory is about to be exceeded. The rasterizing time for each strip is measured or estimated and stored for later use. If the display list does not overflow the memory during input, the rasterization time estimates are checked to see if there are any problem strips. A problem strip is a strip that cannot be rasterized in less time than it takes to print. Problem strips, if any are compressed at step 55, one at a time, in the order in which they are to be printed. As each strip is compressed, the cumulative memory used for storage of the strips is checked at step 56. If all the strips are completed without exhausting memory allotted for the intermediate representation of the page, the complete compressed page is ready for printing at step 74. The time required for decompression for printing at step 74 is predictable and fast enough so that each strip may be decompressed into a raster data buffer in time to transfer the raster data to the print engine controller. Alternatively, some decompression methods work so fast, or can be made fast enough by using an ASIC implementation, that compressed raster data may be decompressed and sent directly to the print engine without being placed into an intermediate raster data buffer. With memory not exceeded either during conversion or compression, processing is easy to estimate and less complex.

Should the test at step 56 indicate the memory for the strips stored as compressed raster data is about to overflow at any point in the compression process, then the rasterizing times for the remaining strips are estimated or measured at step 60. Estimates are preferred at this step, but the times may be measured without storing the raster output. The estimates or measurements yield a complete list of the times for rasterizing each of the strips. Using these strip rasterizing times, a decision is made at step 62 on how to proceed with the page. If one or more of the strips can be rasterized faster than the time which the print engine controller will consume a strip of raster data, there is no need to store the compressed data for those strips; instead they may be generated on the fly as they are needed. The memory thus freed may be reallocated to the compressed raster data for other strips that cannot be rasterized in time, or it may reallocated to storage of the next page of incoming data, so that throughput is increased by overlapping the processing. When all the data for the intermediate representation of the page now can be rasterized, strip by strip, at step 65 fast enough to keep ahead of the print engine, the page is printed at step 74.

However, if the test at step 62 reveals that memory is still insufficient, compressed raster data strips must be reprocessed using lossy compression at step 63. Lossy compression ensures that the memory requirements will be met even if the printed page quality is slightly degraded. If memory requirements are exceeded before reprocessing all the strips, the intermediate representation of the same page may have a combination of uncompressed raster data, lossy-compressed raster data, lossless-compressed raster data, or display list command representations of different strips. Each representation must be converted to raster data for the strip immediately prior to printing at step 74.

This covers all of the cases when the test at step 54 showed the display list commands do not threaten to overflow memory. If the display list commands do threaten to overflow, one or more strips is rasterized and compressed to free up storage for the remaining display list command input. Until the display list is complete, it is possible that display list commands will arrive that affect one or more of the strips previously rasterized and compressed. To complete the rasterizing when one or more new display list commands for a compressed strip arrive so as to again fill the display list memory allocation as determined by the test at step 78, that strip must be decompressed at step 76. Then the new rasterized data added and the strip recompressed at step 66. The cycle of decompression, rasterizing, and compression may occur repeatedly for the same strip and for other strips on a page until all display list commands for the page have been rasterized.

Following the compression process at step 66, a test at step 68 is performed to ensure that the compressed raster data does not again threaten to overflow memory. If it does not, the rasterizing will subsequently go to completion through the cycles of decompression at step 76 and of modification and recompression at step 66, as described. The compressed strips are then printed at step 74.

If storage of compressed strips is found by the test at step 68 to threaten overflow of available memory, raster data is further compressed at step 72 using a lossy compression algorithm. Again, the compression ratio can be selected to assure that the resulting data sets will fit in the memory allotment. Additional display list commands are rasterized by decompressing the lossy-compressed strips, processing the new commands and recompressing the data using lossy compression as required, all of which is included in step 72. When the active display list for the page has been completed, the page is ready for printing at step 74.

Either of the decompression and compression cycles of steps 66 and 72 is likely to require additional processing time compared to the case when the display list commands did not overflow at step 68. The extra time is traded off against the expense of extra memory that would perhaps be used only on very few parts of only a few documents.

Thus in every case printing at step 74 is completed without requiring memory equivalent to a whole page of raster data and without a printer overrun.

Note that the method of the invention is described in a preferred embodiment using a general scheme of additional alternative strip representations. More alternative representations may further optimize processing time for a given amount of memory.

It should be understood that the foregoing description is only illustrative of a preferred embodiment of the invention. Various alternatives and modifications can be devised by those skilled in the art without departing from the spirit and scope of the invention. It should be understood that the order of the steps of the invention may be changed by those skilled in the art and still acheive similar desirable results. While the invention has been described in a laser printer environment, it is equally applicable to other types of page printers. Accordingly, the present invention is intended to embrace all such alternatives and variances which fall within the scope of the appended claims.

We claim:

1. A printer having raster generator for converting a first page representation, encoded in a sequence of page description language commands, into a sequence of raster scanlines in a format required for printing, the raster generator comprising:

means for converting the plurality of successive page description language commands received into a second page representation made up of a plurality of intermediate representations in at least two different formats;

means for logically subdividing the page into regions;

means for converting the plurality of intermediate representations into raster scanlines for less than a full page;

a memory for storing the raster scanlines;

means for supplying the raster scanlines stored in the memory to the print engine at a predetermined rate; and means for estimating required memory, rasterizing time, or both, associated with alternative intermediate representations for the regions of the page and determining therefrom a format of intermediate representation for each region to minimize storage or time requirements while allowing the conversion of the plurality of intermediate representations to raster scanlines at a rate sufficient to provide raster scanlines to the print engine at the predetermined rate, whereby memory is conserved and throughout maximized by converting and storing fewer than all the raster scanlines necessary for a full page.

2. The printer described in claim 1 wherein the plurality of intermediate representations are selected from the class consisting of display list commands, lossless-compressed raster data, lossy-compressed raster data, and uncompressed raster data.

3. The printer of claim 2 wherein each region is a strip and the representation of the page to be printed includes a list of the strips.

4. The printer of claim 1 wherein the means for estimating required memory, rasterizing time, or both, uses formulas applied to the intermediate representations.

5. The printer of claim 1 wherein the means for estimating computes the estimates by computing alternative intermediate format representations for each region, measuring the resultant time or space required for computing each alternative format representation, and storing the resultant time and space information.

6. A method for receiving, in a printer, printer commands representing a page and sending successive print engine commands describing the page to a print engine, comprising:

providing a logical subdivision of the page into a plurality of regions;

encoding the printer commands into a selected one of a set of representations for each region and storing the representation in a memory while monitoring the amount of memory used to detect memory overflow, where the selected representation is one of at least three distinct alternative representations;

detecting as a problem region each region for which print engine commands cannot be generated on the fly from the representation selected for a region before the region is consumed by the print engine during printing;

reacting to a detected memory overflow by changing the representation selection of one of the regions to a representation requiring less use of memory and re-encoding the one of the regions according to the changed selection;

reacting to a detected problem region by changing the representation selection of the problem region to a representation requiring less time to generate print engine commands and re-encoding the problem region according to the changed selection; and generating printer commands from each of the regions when all the regions have been encoded and sending the generated printer commands to the print engine.

7. The method of claim 6 where:

the three alternative representations comprise display list commands, lossless compressed raster data, and lossy compressed raster data; and the initial representation selected for each region of the page is display list commands.

8. A computer program, residing on a computer-readable medium, for receiving in a printer a sequence of page description language commands describing a page and for sending a sequence of raster scanlines describing the page to a print engine, comprising instructions for causing the printer to:

convert the page description language commands for the page to display list commands;

associate each display list command with a region of the page;

store display list commands in a memory;

rasterize the display list commands of a region and store the resulting rasterized region data as uncompressed raster data in the memory;

rasterize the display list commands of a region and store the resulting rasterized region data with lossless compression as lossless compressed raster data in the memory;

rasterize the display list commands of a region and store the resulting rasterized region data with lossy compression as lossy compressed raster data in the memory;

decompress compressed raster data from the memory, add data rasterized from a display list command, recompress the result, and store the compressed result into the memory;

detect a region as a problem region, for which the region display list commands cannot be rasterized on the fly before the print engine will consume the raster data of the region during printing;

detect a memory overflow during the storing of display list commands or during the storing of raster data;

react to the detection of a problem region by invoking instructions to rasterize and compress the region;

react to the detection of a memory overflow by selecting a form of storage requiring less memory for a region and invoking instructions to use the selected form, where the selection is made from alternatives including display list commands, uncompressed raster data, lossless compressed raster data, and lossy compressed raster data; and generate raster scanlines from display list commands, from uncompressed raster data, from lossless compressed raster data, and from lossy compressed raster data to send to the print engine.

9. The computer program of claim 8, where the instructions for causing the printer to decompress a compressed raster region invoke an ASIC implementation of a decompression method.

10. The computer program of claim 8, where the memory is a shared memory that is allocated into portions for different purposes, further comprising instructions for causing the printer to:

allocate the memory dynamically for the purposes of storing display list commands and raster data.

11. The computer program of claim 8, where:

the instructions that react to a problem region invoke instructions to compress the problem region with lossless compression in preference to lossy compression; and the instructions that react to a memory overflow select the forms of display list commands, uncompressed raster data and lossless compressed raster data in preference to lossy compressed raster data.

12. A printer having an input for receiving a page of data in the form of page description language commands, a print engine for printing pages composed of a predetermined sequence of raster scanlines received at a predetermined rate, and a raster generator for converting the received page description language commands into a sequence of raster scanlines in a format required for printing, the raster generator comprising:

a memory;

a convertor for converting the page description language commands received at the input into display list commands;

means for logically dividing the page into a plurality of regions and associating each display list command with a region of the page;

means for determining the amount of time to rasterize each region;

means for determining if the memory is full;

means for determining for each region whether to rasterize the region to the print engine on the fly, to pre-rasterize the region and store it as raster data, to pre-rasterize the region, compress it and store it as lossless compressed raster data, and to revert the lossless compressed raster data to a lossy compressed version of the pre-rasterized version, based on the time estimates for rasterizing each region and available space in the memory such that the page is rasterized on the fly to meet the predetermined rate while memory is conserved.

13. A raster generator having an input for receiving page description language commands, the raster generator for converting the received page description language commands into a sequence of raster scanlines in a format required for outputting according to a predetermined rate, the raster generator comprising:

a convertor for converting the page description language commands received at the input into display list commands;

associating each display list command with a region of the page selected from a set of regions that subdivides the page;

means for determining the amount of time to rasterize each sublist and for detecting any sublist that will not be able to be rasterized fast enough on the fly to satisfy the predetermined rate;

means for determining if the memory is full;

a convertor for converting the display list commands into an alternative format that may be rasterized fast enough to satisfy the predetermined rate if a sublist cannot be rasterized on the fly and for converting the display list commands into an alternative format that frees up memory space if memory is full; and means for storing the alternative format whereby throughput is assured and memory is conserved by transforming display list commands into an alternative format if a sublist would not be able to be rasterized on the fly to meet the predetermined rate and when memory is full.

14. The raster generator of claim 13 wherein the alternative format is selected from the group of rasterized display list commands, compressed rasterized display lists using a lossless compression algorithm and compressed rasterized display lists using a lossy compression algorithm.

15. A raster generator having an input for receiving page description language commands associated with a page to be printed, the raster generator for converting the received page description language commands into a sequence of raster scanlines in a format required for outputting according to a predetermined rate, the raster generator comprising:

a first convertor for converting the page description language commands received at the input into a display list command format;

a memory including one or more sublists for storing display list commands;

means for determining if the memory is full;

a second convertor for converting display list commands into a different alternative format that will free up memory;

means for determining if converting subsequent page description language commands associated with the page into a display list command format will cause the memory to become full; and a third convertor for converting the display list commands in the alternative format into a third format that will free up memory, the third format being different from both the alternative format and the display list command format.

16. The raster generator of claim 15 wherein the alternative format is selected from the group of rasterized display list commands, compressed rasterized display lists using a lossless compression algorithm.

17. The raster generator of claim 15 wherein the third format is compressed rasterized display lists using a lossy compression algorithm.

18. A method for receiving in a printer a page representation incorporating a sequence of page description language commands and sending a sequence of raster scanlines describing the page to a print engine, comprising:

converting the page description language commands to display list commands;

associating each display list command with a region of the page selected from a set of regions that subdivides the page;

encoding each region of the page into a selected one of a set of representations and storing the representation in a memory while monitoring the amount of memory used in order to detect memory overflow, where the set of representations comprises display list commands, uncompressed raster data, lossless compressed raster data, and lossy compressed raster data;

identifying a region as a problem region when representation for the region cannot be rasterized on the fly before the print engine will consume the region during printing;

reacting to a detected memory overflow by changing the selection of one of the regions of the page to a representation requiring less use of memory and re-encoding the one of the regions according to the changed selection;

reacting to the detection of a problem region by changing the selection of the problem region of the page to a representation which is able to be rasterized on the fly and re-encoding the region according to the changed selection; and generating raster scanlines from each of the regions and sending them to the print engine.

19. A method of reducing the memory requirements for a printer that receives a page description language representation of a page to be printed, the method comprising:

converting page description language commands for the page into a display list command format;

storing display list commands in one or more sublists of a memory;

determining if the memory is full;

converting display list commands into a different alternative format that will free up memory;

determining if converting subsequent page description language commands associated with the page into a display list command format will cause the memory to become full; and converting the display list commands in the alternative format into a third format that will free up memory, the third format being different from both the alternative format and the display command format.

* * * * *